M. BLUMENTHAL.
SLIP COUPLING FOR ELECTRIC CABLE CONDUITS.
APPLICATION FILED FEB. 1, 1915.
1,218,621. Patented Mar. 13, 1917.
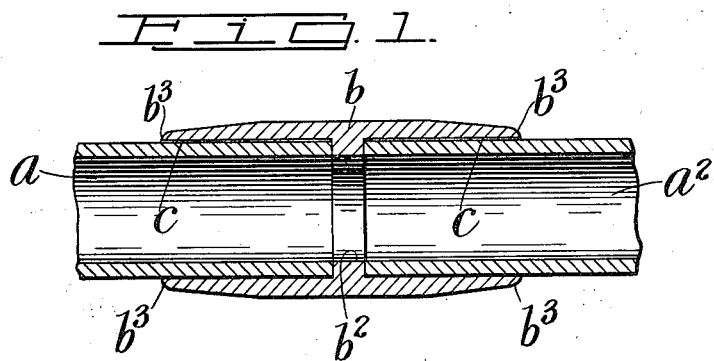
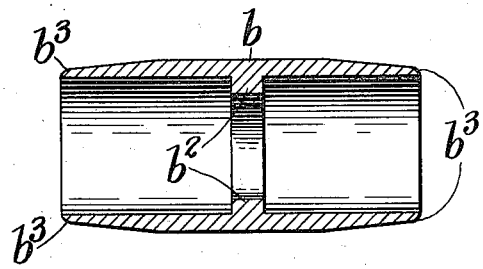
Inventor
Maurice Blumenthal,
By his Attorney

UNITED STATES PATENT OFFICE.

MAURICE BLUMENTHAL, OF BROOKLYN, NEW YORK.

SLIP-COUPLING FOR ELECTRIC-CABLE CONDUITS.

1,218,621.   Specification of Letters Patent.   Patented Mar. 13, 1917.

Application filed February 1, 1915. Serial No. 5,424.

*To all whom it may concern:*

Be it known that I, MAURICE BLUMENTHAL, a citizen of the United States, and residing at Brooklyn, in the county of Kings and State of New York, have invented certain new and useful Improvements in Slip-Couplings for Electric-Cable Conduits, of which the following is a specification, such as will enable those skilled in the art to which it appertains to make and use the same.

This invention relates to couplings for electric cable conduit pipes, and the object thereof is to provide an improved device of this class by means of which electric cable conduits may be quickly and easily connected in such manner as to permit the easy passage therethrough of electric cables; a further object being to provide a conduit coupling of the class specified which is simple in construction and comparatively inexpensive, and which may be used wherever devices of this class are required.

The invention is fully disclosed in the following specification, of which the accompanying drawing forms a part, in which the separate parts of my improvement are designated by suitable reference characters in each of the views, and in which:—

Figure 1 is a sectional view showing my improved conduit coupling and two pipe sections or members connected therewith;—

Fig. 2 a similar view of the coupling detached.

In the drawing forming part of this specification, I have shown at $a$ and $a^2$ in Fig. 1 two sections or members of an electric cable conduit, and at $b$ I have shown my improved coupling.

The coupling $b$ is tubular in form as are also the conduit members $a$ and $a^2$, and said coupling is provided centrally of its inner wall or walls with an annular rib or bead $b^2$ which is rectangular in cross section, and which is of a thickness slightly greater than that of the walls of the conduit members $a$ and $a^2$, and when the ends of said conduit members are inserted into said coupling as shown in Fig. 1 they, together with the rib or bead $b^2$ form a continuous passage, the walls of which are smooth and even throughout and electric cables or similar devices may be easily passed therethrough without striking an obstruction of any kind or class.

It will also be observed that the ends of the coupling are beveled as shown at $b^3$, and this is particularly useful where it is desired, or necessary, to pass electric conduits or pipes outwardly through the wall of a basement or cellar and make connection with main supply cables arranged adjacent to a building, and in this operation a hole is made in a wall of the cellar or basement and a short sectional pipe is passed therethrough and driven into the ground after which a coupling is applied to said pipe and another short sectional pipe is then applied to the coupling, and both sections of pipe and the coupling are then driven farther through the wall and into the earth outside of the wall, and this operation is repeated until connection is made with the main electric conduit adjacent to the building, and it will be understood that any desired number of couplings and pipe sections may be employed in this operation. It will also be apparent that said coupling may be driven through walls or partitions without first preparing a hole for the same, as said beveled edges $b^3$ will act as cutting edges when desired.

I also preferably provide for a slight clearance between the coupling and the ends of the conduit members as shown at $c$ in Fig. 1, in order that the conduit members may be easily inserted into the coupling.

Although I have described my improvement as particularly designed for use as a coupling for electric conduits or conduit pipes, my invention is not limited to this use, and said coupling may be employed wherever practical.

In connecting conduit pipes of the class specified, and by the usual means, or by simply abutting the ends thereof and inclosing or covering said ends with cement, concrete or the like material, portions of the said material work in between the ends of the pipe and set or become hard and thus form obstructions in the conduit which are very hard to remove and which interfere with, or prevent, the passing of electric cables through the conduit, but with my improved coupling all this is obviated, the inner walls of the conduit being made smooth and even where the separate parts thereof are connected.

Having fully described my invention, what

I claim as new and desire to secure by Letters Patent, is:—

A tubular slip coupling for conduit pipes comprising an elongated sleeve having the outer surface of its ends tapered inwardly to form inclined cutting edges to facilitate the driving of the same through a wall or partition, said coupling being provided centrally of its interior with a sharp cornered annular bead of a thickness slightly greater than that of the walls of the pipes to be coupled, whereby a substantially continuous smooth surface is provided between the inner wall of the bead and inner surfaces of the pipes.

In testimony that I claim the foregoing as my invention I have signed my name in presence of the subscribing witnesses this 29th day of January 1915.

MAURICE BLUMENTHAL.

Witnesses:
C. MULREANY,
H. I. THOMPSON.